United States Patent [19]

Mori

[11] Patent Number: 5,422,669
[45] Date of Patent: Jun. 6, 1995

[54] SOLID STATE IMAGING APPARATUS

[75] Inventor: Hiroshi Mori, Kanagawa, Japan

[73] Assignee: Sony Corporation, Tokyo, Japan

[21] Appl. No.: 989,330

[22] Filed: Dec. 11, 1992

[30] Foreign Application Priority Data

Dec. 13, 1991 [JP] Japan .................. 3-330652

[51] Int. Cl.⁶ .................. H04N 5/335; H04N 3/14; H04N 5/238
[52] U.S. Cl. .................. 348/230; 348/363; 348/224; 348/228; 257/229; 257/223; 257/237; 257/239
[58] Field of Search ........... 358/228, 209, 229, 213.19; 257/229, 223, 237, 239

[56] References Cited

U.S. PATENT DOCUMENTS

| | | | |
|---|---|---|---|
| 4,843,474 | 6/1989 | Suzuki | 358/213.19 |
| 4,868,667 | 9/1989 | Tani et al. | 358/228 |
| 5,166,800 | 11/1992 | Mori et al. | 358/213.27 |
| 5,214,274 | 3/1993 | Yang | 250/208.1 |
| 5,223,935 | 6/1993 | Tsuji et al. | 358/228 |
| 5,225,695 | 7/1993 | Naka et al. | 257/239 |

Primary Examiner—Joseph Mancuso
Assistant Examiner—B. Shalwala
Attorney, Agent, or Firm—Hill, Steadman & Simpson

[57] ABSTRACT

A solid state imaging apparatus which prevents occurrence of small aperture fading by diffraction of light and can control the amplitude level of an image signal within a prescribed range. The solid state imaging apparatus employs a solid state imaging element such as a CCD. When the level of an image signal outputted from the solid state imaging element exceeds a predetermined value, a driving motor is driven to effect adjustment of an iris. The capacitance of a variable capacitance diode provided in a voltage converting section of the solid state imaging element is controlled in accordance with the amplitude level of the image signal to control the voltage conversion efficiency of the voltage converting section of the solid state imaging element so as to fix the level of the image signal.

1 Claim, 3 Drawing Sheets

SOLID STATE IMAGING APPARATUS

BACKGROUND OF THE INVENTION

1. Field of the Invention

This invention relates to a solid state imaging apparatus which employs a solid state imaging element such as a CCD (charge coupled device), and more particularly to a solid state imaging apparatus wherein a solid state imaging element itself is used as gain adjusting means.

2. Description of the Related Art

Solid state imaging apparatus which employ a solid state imaging element such as a CCD is generally constructed in such a manner as shown in FIG. 3.

Referring to FIG. 3, the solid state imaging apparatus is generally denoted at 10 and includes an optical system 12, an optical iris system 13 and a solid state imaging element 14 such as a CCD. An optical image of a subject 11 is formed by way of the optical system 12 and the iris system 13 on the CCD 14, at which it is converted into an electric signal, that is, an image signal.

Detailed construction of the CCD 14 is shown in FIG. 4. Referring to FIG. 4, the CCD shown is of the frame interline transfer type and includes a frame accumulating section 20 and a horizontal transfer section 21.

The accumulating section 20 includes a plurality of vertical transfer sections (vertical shift registers) 23 formed corresponding to individual columns of picture elements 22 which are disposed in a two-dimensional arrangement, that is, in rows and columns. Accumulated charge is transferred line by line in the horizontal transfer section 21 and converted into a signal (voltage signal) by a voltage converting section 24. An image signal after conversion into a voltage is outputted to a terminal 26 by way of a horizontal output amplifier 25. Referring back to FIG. 3, an image signal obtained from the CCD 14 is supplied to a signal processing system 15, from which it is outputted as a video signal (composite signal) of the NTSC system.

The image signal from the CCD 14 is supplied also to a detecting circuit 16, at which an amplitude level of the image signal is detected. A detection output of the detecting circuit 16 is supplied to a motor driver 17 so that an iris driving motor 18 is controlled in accordance with the thus received detection output to effect iris control so that the image signal may present a predetermined level.

While such iris control is popular exposure controlling means for the adjustment of the level of an image signal in this manner in a conventional solid state imaging apparatus, according to the iris control, when the subject 11 to be photographed is particularly bright, the iris 13 will be controlled until the aperture of the lens or optical system 12 is reduced to its minimum aperture.

However, if the iris 13 is controlled to the minimum aperture position in this manner, then small aperture fading is caused by diffraction of light at the iris 13, and this makes a cause of deterioration of the picture quality. However, if the minimum aperture is adjusted so that small aperture fading may not take place, then sufficient iris control cannot be effected now and an image signal cannot be restricted to a necessary level.

SUMMARY OF THE INVENTION

It is an object of the present invention to provide a solid state imaging apparatus which prevents occurrence of small aperture fading by diffraction of light and can control the amplitude level of an image signal within a prescribed range.

In order to attain the object, according to the present invention, there is provided a solid state imaging apparatus, which comprises solid state imaging means for producing a charge signal corresponding to incident light and outputting the charge signal by transferring the charge signal, converting means for receiving the transferred charge signal and converting the received charge signal into a voltage signal, detecting means for detecting an amplitude of the voltage signal, and controlling means for controlling the conversion ratio of the converting means in accordance with the amplitude of the voltage signal. Preferably, the solid state imaging apparatus further comprises optical iris means for controlling the quantity of the incident light. Preferably, the solid state imaging apparatus further comprises comparing means for comparing the amplitude of the voltage signal with a reference voltage signal, and the optical iris means is fixed when the amplitude of the voltage signal exceeds the reference voltage signal.

In the solid state imaging apparatus, a corresponding charge signal is produced from incident light by the solid state imaging means and converted into a voltage signal by the converting means. An amplitude of the voltage signal is detected by the detecting means, and the controlling means controls the conversion ratio of the converting means in accordance with the amplitude of the voltage signal from the detecting means. In this instance, the conversion ratio of the converting means is controlled so that it may be lowered when the amplitude of the voltage signal from the detecting means is higher than a predetermined level. Accordingly, the voltage signal from the converting means, that is, an image signal, always keeps a predetermined level.

Meanwhile, the amplitude of the voltage signal from the detecting means is compared with the reference voltage signal by the comparing means. The reference voltage signal represents a voltage level corresponding to an amplitude level of the voltage signal corresponding to a minimum aperture of the optical iris means at which small aperture fading by diffraction of light does not occur. When the amplitude of the voltage signal exceeds the reference voltage signal, the optical iris means is controlled so that it may be fixed.

In summary, in the solid state imaging apparatus, the conversion ratio of the converting means is controlled and the optical iris means is additionally controlled so that the level of the voltage signal from the converting means may be controlled to a predetermined value. Accordingly, small aperture fading by diffraction of light is prevented, or in other words, deterioration of the picture quality is prevented, and besides, the level of the voltage signal as an image signal can be controlled to a predetermined level.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
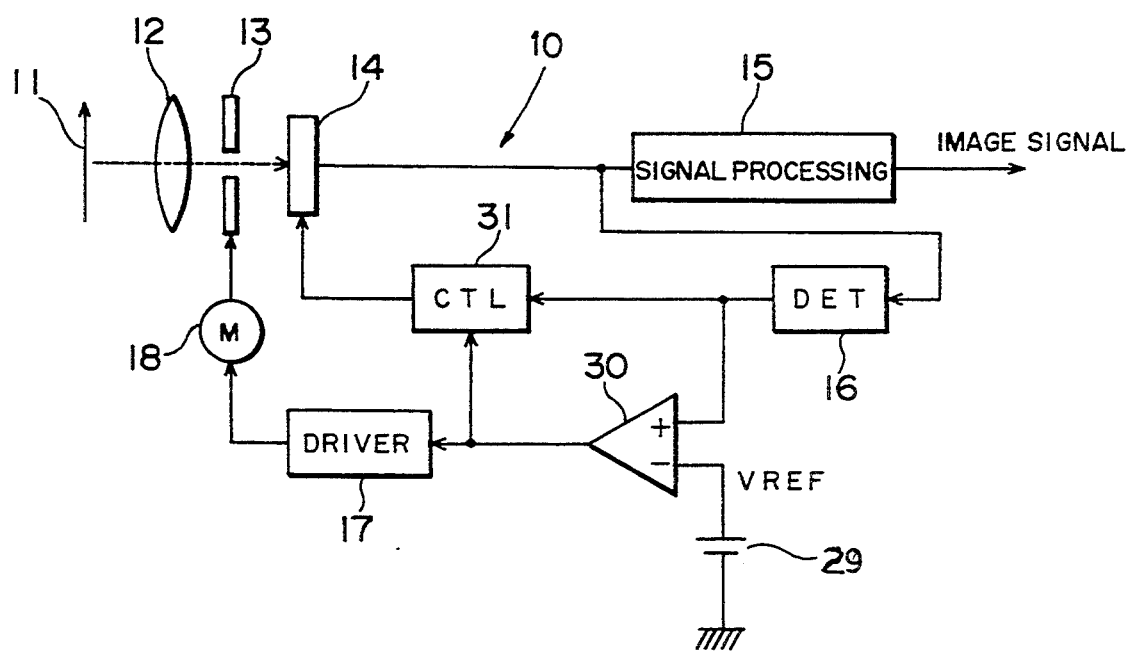
FIG. 1 is a block diagram of a solid state imaging apparatus showing a preferred embodiment of the present invention.
Figure 3:
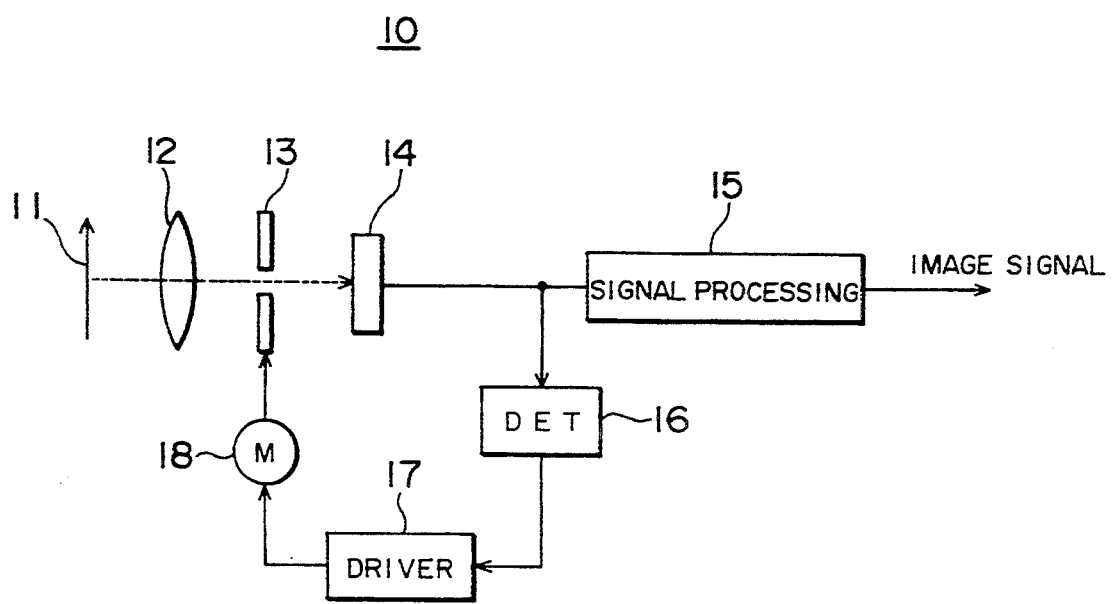
FIG. 3 is a block diagram of a conventional solid state imaging apparatus.

Referring first to FIG. 1, there is shown a solid state imaging apparatus to which the present invention is applied. The solid state imaging apparatus generally denoted at 10 includes a CCD 14 as a solid state imaging element and is generally constructed such that the voltage conversion efficiency of the CCD and the iris aperture are controlled so that an image signal may present a predetermined level. The solid state imaging apparatus 10 further includes an optical system 12, an optical iris system 13, a signal processing system 15, a detecting circuit 16, a motor driver 17 and an iris driving motor 18, all of which are similar to those of the conventional solid state imaging apparatus described hereinabove with reference to FIG. 3. Accordingly, overlapping description of those elements is omitted herein to avoid redundancy.

In the present solid state imaging apparatus, an optical image is converted into an electric signal by the CCD 14. The electric signal is supplied as an image signal to the signal processing system 15, which produces, from the image signal supplied thereto, a composite video signal, primary color signals of R, G and B and so forth and outputs the thus produced signals.

Meanwhile, the image signal from the CCD 14 is supplied also to the detecting circuit 16, at which an amplitude level of the image signal is detected. A detection output of the detecting circuit 16 is supplied to a comparator 30, at which it is compared with a reference level (voltage) VREF from a reference level source 29. The reference level VREF corresponds to an amplitude level of an image signal which is obtained, when the aperture of the iris 13 is controlled, with a minimum aperture at which small aperture fading by diffraction of light does not occur.

A comparison output of the comparator 30 is supplied to the driver 17 for the driving motor 18 for driving the iris 13 so that aperture control of the iris 13 is performed. The amplitude level of the image signal is controlled to a predetermined level by controlling the aperture of the iris 13.

The comparison output of the comparator 30 and the detection output of the detector 30 are supplied also to a controlling circuit 31 for the CCD 14. The controlling circuit 31 is provided for controlling the conversion ratio, that is, the voltage conversion efficiency of the CCD 14 and will be described in more detail below.

Figure 2:
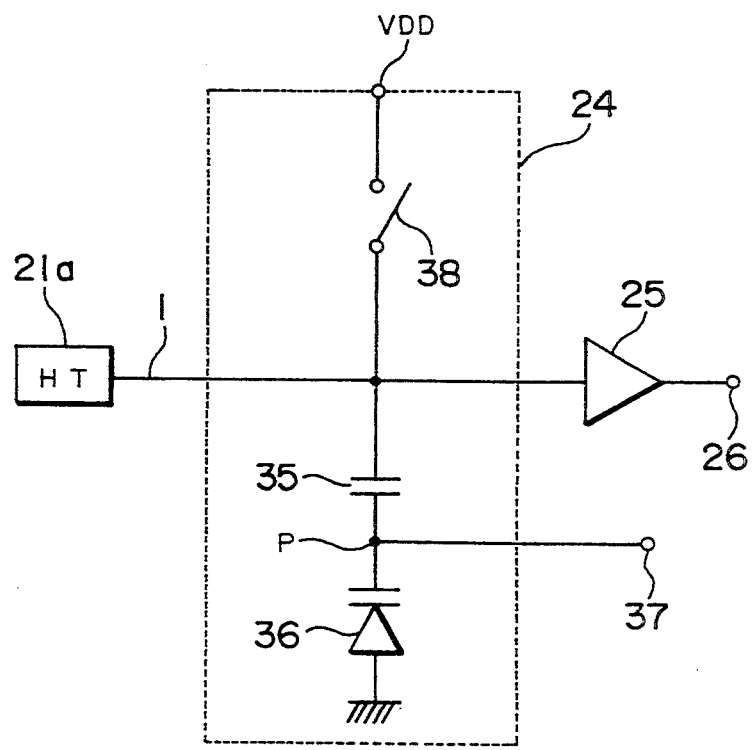
FIG. 2 is a circuit diagram showing details of a voltage converting section of a CCD of the solid state imaging apparatus shown in FIG. 1.
Figure 4:
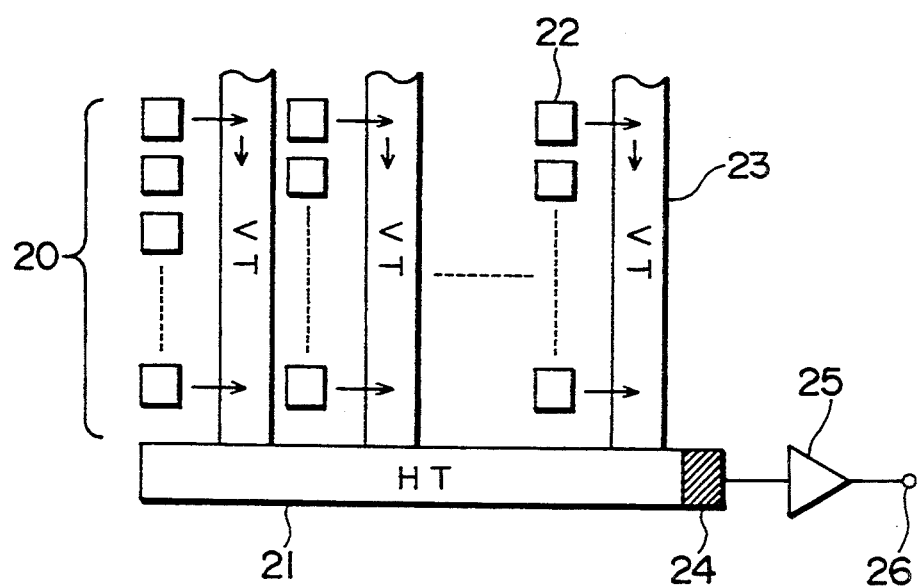
FIG. 4 is a schematic plan view illustrating construction of a CCD.

Referring now to FIG. 2, reference numeral 21a denotes a portion at the last stage of the horizontal transfer section 21 described hereinabove with reference to FIG. 4. A voltage converting section 24 is provided at the transfer section last stage 21a and converts signal charge (charge corresponding to a brightness of an optical image) transferred to the transfer section last stage 21a into an electric signal or voltage, that is, into an image signal.

The voltage converting section 24 includes a capacitor 35 of a fixed capacitance formed in a CCD semiconductor substrate not shown and a variable capacitance diode 36 connected in series to the capacitor 35. The capacitor 35 and the variable capacitance diode 36 are connected to a signal line 1 from the transfer section last stage 21a. The voltage converting section 24 further includes a reset switch 38 connected between a predetermined power source VDD and the signal line 1.

A control terminal 37 is provided at a junction between the capacitor 35 and the variable capacitance diode 36, and the controlling output (voltage) of the controlling circuit 31 described above is supplied to the control terminal 37. The capacitance of the variable capacitance diode 36 is controlled in accordance with the controlling voltage applied to the control terminal 37. In the present circuit configuration, the capacitance of the variable capacitance diode 36 increases as the controlling voltage increases.

Referring back to FIG. 1, the detection output of the detecting circuit 16 is supplied to the controlling circuit 31, from which a controlling voltage corresponding to the received detection output is outputted. The controlling circuit 31 is further constructed such that it starts its controlling operation only after the comparison output of the comparator 30 changes over to a low level, in short, after the detection output becomes lower than the reference level VREF.

Accordingly, only when the iris 13 is restricted to its minimum aperture defined by the reference level VREF and besides the level of the image signal is still high, the comparison output of the comparator 30 changes over to a low level, and in response to the changing over of the level, the controlling circuit 31 starts its operation. Consequently, a controlling voltage corresponding to the detection output of the detector 30 then is produced by the controlling circuit 31 and applied to the control terminal 37.

Where the output voltage of the signal line 1 is represented by V, the capacitance of the capacitor 35 by Ca and the capacitance of the variable capacitance diode 36 by Cb, the relationship between the signal charge Q and the parameters given just above is given by the following equation:

$$Q = \{C_a \cdot C_b / (C_a + C_b)\} V$$

Accordingly, in order to lower the output voltage V, control should be performed so as to decrease the capacitance Cb. To this end, a controlling voltage corresponding to the detection output of the detector 16 should be applied to the control terminal 37. As the controlling voltage is thus applied, the capacitance Cb of the variable capacitance diode 36 increases correspondingly. Consequently, the output voltage V is restricted. This signifies that the voltage conversion efficiency of the voltage converting section 24 of the CCD 21 is controlled in accordance with the detection level of the detector 16.

Since the amplitude level of the image signal to be outputted from the output terminal 26 of the CCD 14 can be controlled by controlling the voltage conversion efficiency of the voltage converting section 24 in this manner, the amplitude of the image signal to be outputted can be controlled to a predetermined level.

While the solid state imaging apparatus of the construction shown in FIG. 1 employs both of control of the voltage conversion efficiency of the CCD 14 and iris control and gives the precedence to the iris control, the precedence need not be given to the iris control, but either of the controlling systems may start its controlling operation first.

The anticipated object of the present invention can be achieved also by the sole control of the voltage conversion efficiency of the CCD 14. In this instance, the iris 13 will be manually adjusted, and the minimum aperture available with manual adjustment is set to a minimum aperture at which small aperture fading by diffraction of light described above does not take place.

The CCD 14 need not be of the frame interline transfer type but may be any of the interline transfer type, the frame transfer type or some other transfer type. In addition, the solid state imaging element is not limited to a CCD.

Having now fully described the invention, it will be apparent to one of ordinary skill in the art that many changes and modifications can be made thereto without departing from the spirit and scope of the invention as set forth herein.

What is claimed is:

1. A solid state imaging apparatus, comprising:

solid state imaging means for producing a charge signal corresponding to incident light and outputting the charge signal by transferring the charge signal:

converting means for receiving the transferred charge signal and converting the received charge signal into a voltage signal, and having an input terminal for controlling the conversion ratio of the solid state imager:

detecting means for detecting an amplitude of the voltage signal; and controlling means for controlling the conversion ratio of said converting means in accordance with the amplitude of the voltage signal, and supplying an input to the input terminal of said converting means, further comprising an optical iris control means for controlling the quantity of the incident light, further comprising comparing means for comparing the amplitude of the voltage signal with a reference voltage signal and wherein said optical iris control means is fixed when the amplitude of the voltage signal exceeds the reference voltage signal, wherein said controlling means controls the conversion ratio of said converting means when the amplitude of the voltage signal exceeds the reference voltage signal, and wherein said converting means includes a reset switch and a fixed capacitor connected in series between a first potential and a ground potential, and includes a variable capacitance diode connected between said fixed capacitor and the ground potential, the capacitance of said variable capacitance diode being controlled in accordance with the amplitude of the voltage signal, said input terminal connected between said variable capacitance diode, and said fixed capacitor.

* * * * *